United States Patent
Davis et al.

(10) Patent No.: US 10,487,943 B2
(45) Date of Patent: Nov. 26, 2019

(54) MULTI-PLY SEAL RING

(71) Applicant: United Technologies Corporation, Farmington, CT (US)

(72) Inventors: Timothy M. Davis, Kennebunk, ME (US); Jeffrey M. Wittman, Wells, ME (US); Jose R. Paulino, Saco, ME (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/208,221

(22) Filed: Jul. 12, 2016

(65) Prior Publication Data

US 2018/0017168 A1 Jan. 18, 2018

(51) Int. Cl.
*F16J 15/08* (2006.01)
*F01D 11/00* (2006.01)

(52) U.S. Cl.
CPC ......... *F16J 15/0887* (2013.01); *F01D 11/005* (2013.01); *F05D 2250/75* (2013.01)

(58) Field of Classification Search
CPC .... F16J 15/442; F16J 15/3284; F16J 15/0887; F16J 15/062; F01D 11/005
See application file for complete search history.

(56) References Cited

U.S. PATENT DOCUMENTS

| | | | |
|---|---|---|---|
| 3,572,734 A * | 3/1971 | Holt | F16J 15/3236 277/556 |
| 3,734,234 A | 5/1973 | Wirt | |
| 3,909,076 A * | 9/1975 | Kato | B62D 55/0887 277/363 |
| 3,913,702 A | 10/1975 | Wirt et al. | |
| 4,133,542 A * | 1/1979 | Janian | F16J 15/3208 277/555 |
| 4,257,998 A | 3/1981 | Diepenbrock, Jr. et al. | |
| 4,336,943 A | 6/1982 | Chaplin | |
| 4,508,356 A * | 4/1985 | Janian | F16J 15/3208 267/1.5 |
| 4,589,666 A * | 5/1986 | Halling | F16J 15/0887 277/631 |
| 4,602,795 A * | 7/1986 | Lillibridge | F16J 9/18 277/644 |
| 4,602,888 A * | 7/1986 | Court | F16J 15/0887 267/1.5 |
| 4,759,555 A * | 7/1988 | Halling | F16J 9/18 277/631 |
| 4,784,397 A * | 11/1988 | Tozer | F16J 15/0887 277/644 |

(Continued)

FOREIGN PATENT DOCUMENTS

| | | | |
|---|---|---|---|
| EP | 1177367 A1 | 2/2002 | |
| GB | 2252075 A | 7/1992 | |
| WO | WO 0070192 A1 * | 11/2000 | ............ F01D 11/005 |

*Primary Examiner* — Eugene G Byrd
(74) *Attorney, Agent, or Firm* — O'Shea Getz P.C.

(57) ABSTRACT

A multi-ply seal ring includes an inner seal ring and an outer seal ring. The inner seal ring includes a plurality of discrete inner ring segments disposed circumferentially about an axis in an annular array. The inner ring segments are arranged end-to-end within the annular array. The inner seal ring is engaged with and nested within the outer seal ring. In addition or alternatively, the outer seal ring may include a plurality of discrete outer ring segments disposed circumferentially about the axis in an annular array.

23 Claims, 9 Drawing Sheets

(56) References Cited

U.S. PATENT DOCUMENTS

| | | | |
|---|---|---|---|
| 4,917,391 A | 4/1990 | Shelinbarger, Jr. et al. | |
| 5,249,814 A * | 10/1993 | Halling | F16J 15/0887 228/214 |
| 5,630,593 A * | 5/1997 | Swensen | F16J 15/0887 277/626 |
| 5,923,003 A | 7/1999 | Arcas et al. | |
| 6,199,871 B1 * | 3/2001 | Lampes | F01D 11/005 277/614 |
| 6,237,921 B1 * | 5/2001 | Liotta | F01D 11/005 277/630 |
| 6,299,178 B1 * | 10/2001 | Halling | F16J 15/0887 277/644 |
| 6,352,267 B1 * | 3/2002 | Rode | F16J 15/0887 277/631 |
| 6,752,592 B2 * | 6/2004 | Mohammed-Fakir | F01D 11/005 415/139 |
| 7,080,513 B2 * | 7/2006 | Reichert | F01D 9/023 277/628 |
| 7,101,147 B2 * | 9/2006 | Balsdon | F01D 11/005 277/642 |
| 7,121,790 B2 | 10/2006 | Fokine et al. | |
| 7,152,864 B2 * | 12/2006 | Amos | F01D 11/005 277/650 |
| 7,497,443 B1 * | 3/2009 | Steinetz | F16J 15/0887 277/644 |
| 7,878,756 B2 | 2/2011 | Davis et al. | |
| 8,016,297 B2 | 9/2011 | Heinemann et al. | |
| 8,016,549 B2 * | 9/2011 | Shah | F01D 5/16 277/650 |
| 8,651,497 B2 * | 2/2014 | Tholen | F01D 11/005 277/644 |
| 8,739,547 B2 | 6/2014 | Jarmon et al. | |
| 8,961,108 B2 * | 2/2015 | Bergman | F01D 25/246 415/115 |
| 9,103,225 B2 * | 8/2015 | Lutjen | F01D 11/08 |
| 9,182,041 B2 * | 11/2015 | Daub | F16J 15/3212 |
| 2005/0057003 A1 * | 3/2005 | Iguchi | F16J 15/0887 277/591 |
| 2005/0082768 A1 * | 4/2005 | Iguchi | F01D 11/005 277/591 |
| 2005/0206097 A1 * | 9/2005 | Datta | F16J 15/3212 277/644 |
| 2008/0106046 A1 * | 5/2008 | Datta | F16J 15/0887 277/644 |
| 2008/0187430 A1 * | 8/2008 | Datta | H01L 21/67126 414/805 |
| 2010/0072710 A1 * | 3/2010 | Morgan | F01D 9/042 277/399 |
| 2012/0195743 A1 * | 8/2012 | Walunj | F01D 11/006 415/174.5 |
| 2012/0235366 A1 * | 9/2012 | Walunj | F01D 5/3007 277/647 |
| 2013/0113168 A1 * | 5/2013 | Lutjen | F01D 11/005 277/644 |
| 2013/0251510 A1 | 9/2013 | Runyan et al. | |
| 2015/0110603 A1 | 4/2015 | Biset et al. | |
| 2015/0330241 A1 | 11/2015 | Chuong et al. | |
| 2015/0354389 A1 * | 12/2015 | Pack | F01D 11/008 416/204 A |
| 2016/0003078 A1 * | 1/2016 | Stevens | F01D 11/005 277/647 |

* cited by examiner

MULTI-PLY SEAL RING

BACKGROUND OF THE INVENTION

1. Technical Field

This disclosure relates generally to seals and, more particularly, to a seal ring.

2. Background Information

A seal ring may be used to seal a gap between two components. Various types of seal rings are known in the art. While these seal rings have various benefits, there is still room in the art for improvement.

SUMMARY OF THE DISCLOSURE

According to an aspect of the present disclosure, a multi-ply seal ring is provided that includes an inner seal ring and an outer seal ring. The inner seal ring includes a plurality of discrete inner ring segments disposed circumferentially about an axis in an annular array. The inner ring segments are arranged end-to-end within the annular array. The inner seal ring is engaged with and nested within the outer seal ring.

According to another aspect of the present disclosure, another multi-ply seal ring is provided that includes an inner seal ring and an outer seal ring. The inner seal ring is configured from or otherwise includes metal with a single crystal microstructure and extends circumferentially about an axis. The inner seal ring is engaged with and nested within the outer seal ring.

According to another aspect of the present disclosure, another multi-ply seal ring is provided that includes a plurality of seal rings including an inner seal ring and an outer seal ring. The inner seal ring is engaged with and nested within the outer seal ring. A first of the seal rings includes a plurality of discrete ring segments disposed circumferentially about an axis in an annular array, where the ring segments are arranged end-to-end within the annular array.

According to still another aspect of the present disclosure, an assembly is provided for rotational equipment. This assembly includes a first component, a second component and a multi-ply seal ring substantially sealing a gap between the first component and the second component. The multi-ply seal ring includes an inner seal ring and an outer seal ring. The inner seal ring is engaged with and nested within the outer seal ring. The inner seal ring includes a plurality of discrete inner ring segments disposed circumferentially about an axis in an annular array. The inner seal ring is configured from or otherwise includes first material. The outer seal ring is configured from or otherwise includes second material that is different than the first material.

The first of the seal rings may be the inner seal ring. The ring segments may be inner ring segments.

The first of the seal rings may be the outer seal ring. The ring segments may be outer ring segments.

The rotational equipment may be configured as or otherwise include a gas turbine engine. The first component and the second component may be configured as static components of the gas turbine engine.

The first material may be metal with a single crystal microstructure.

A first of the inner ring segments may be configured from or otherwise include metal with a single crystal microstructure.

The inner seal ring may be configured from or otherwise include first material.

The outer seal ring may be configured from or otherwise include second material that is different than the first material.

The inner seal ring may be configured from or otherwise include first material.

The outer seal ring may be configured from or otherwise include second material that is the same as the first material.

The outer seal ring may be a generally annular unitary body.

The outer seal ring may include a plurality of discrete outer ring segments disposed circumferentially about the axis in a second annular array. The outer ring segments may be arranged end-to-end within the second annular array. Ends of the outer ring segments may be circumferentially offset from ends of the inner ring segments.

A first of the inner ring segments may be bonded to the outer seal ring.

A first of the inner ring segments may be mechanically secured with the outer ring seal.

A retainer may be included that secures a first of the inner ring segments with the outer seal ring.

An anti-rotation feature may be included that secures a first of the inner ring segments with the outer seal ring.

The inner seal ring and the outer seal ring may each be configured with a cross-sectional geometry with a single undulation.

The inner seal ring and the outer seal ring may each be configured with a cross-sectional geometry with a plurality of undulations.

The inner seal ring may include a plurality of discrete inner ring segments disposed circumferentially about the axis in an annular array. The inner ring segments may be arranged end-to-end within the annular array.

The outer seal ring may be configured as or otherwise include second material that is different than the metal.

The outer seal ring may be configured as or otherwise include second material that is the same as the metal.

The outer seal ring may be configured as or otherwise include a unitary generally annular body.

The foregoing features and the operation of the invention will become more apparent in light of the following description and the accompanying drawings.

DETAILED DESCRIPTION OF THE INVENTION

Figure 1:
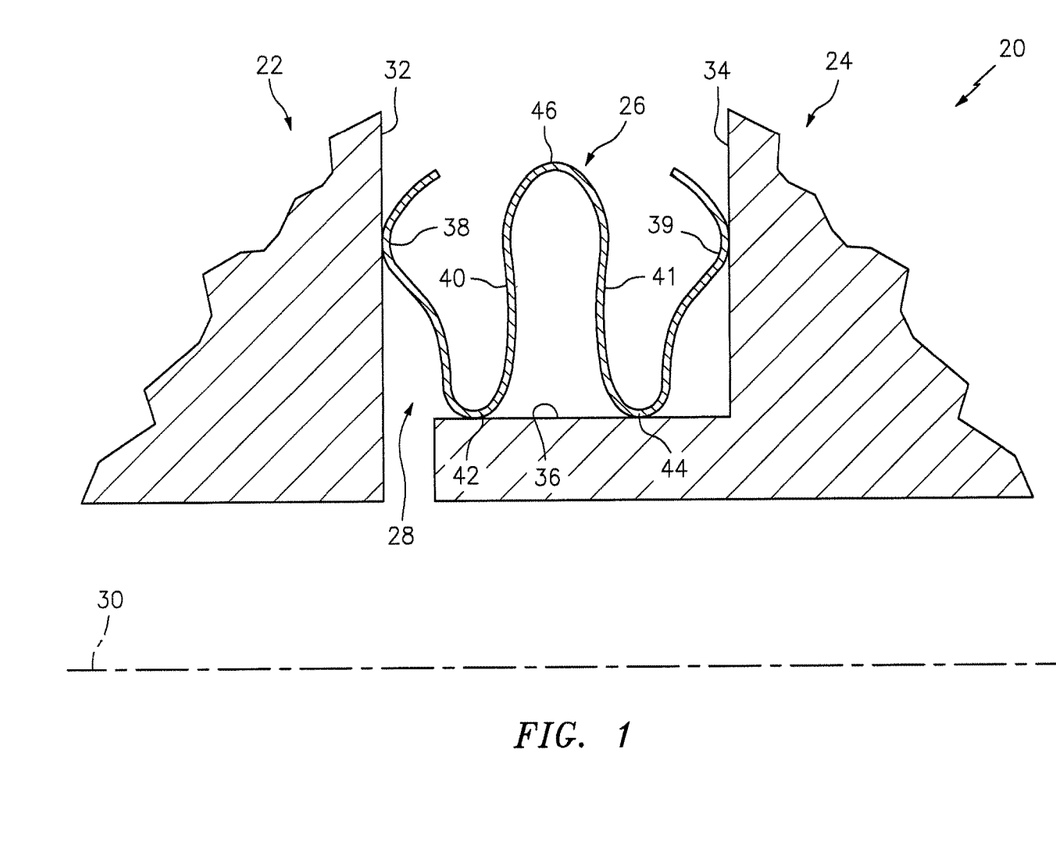
FIG. 1 is a partial schematic sectional illustration of an assembly for a piece of rotational equipment.
Figure 12:
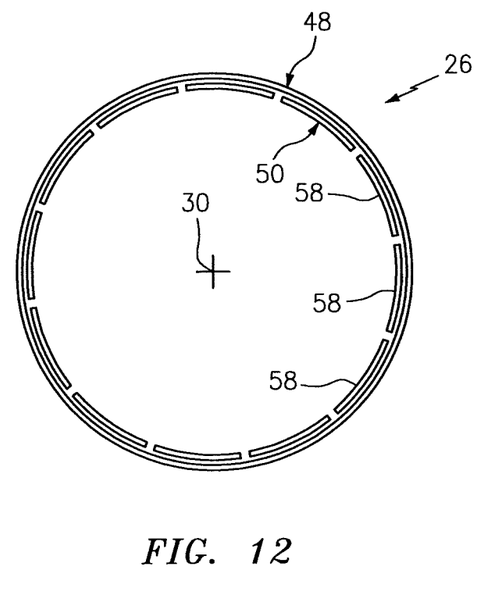
FIG. 12 is a schematic end view of an alternative inner seal ring and the segmented outer seal ring.

FIG. 1 illustrates a portion of an assembly 20 for a piece of rotational equipment. The rotational equipment may be configured and is described below for ease of description as a gas turbine engine. This gas turbine engine may be configured as or included in an aircraft propulsion system (see FIG. 12), an auxiliary power unit (APU), or an industrial gas turbine engine. However, the present disclosure is not limited to such exemplary gas turbine engine applications. Furthermore, the assembly 20 may alternatively be configured for a wind turbine, a water turbine or any other type of equipment (rotational or otherwise) which may include a seal as described below.

The assembly 20 of FIG. 1 includes a first component 22 of the gas turbine engine and a second component 24 of the gas turbine engine. The assembly 20 also includes a multi-ply seal ring 26 configured to substantially seal a gap 28 between the first component 22 and the second component 24. More particularly, the multi-ply seal ring 26 is arranged axially between and axially engages (e.g., contacts) the first component 22 and the second component 24. The present disclosure, however, is not limited to such an exemplary arrangement as described below in further detail; e.g., see FIGS. 5 and 6.

The first component 22 of FIG. 1 includes and extends axially along an axis 30 of the assembly 20 to a first seal land 32. This first seal land 32 may be configured as a generally annular surface. More particularly, the first seal land 32 extends circumferentially around the axis 30. The first seal land 32 also extends radially between inner and outer seal land ends.

The second component 24 includes and extends axially along the axis 30 to a second seal land 34. This second seal land 34 may be configured as a generally annular surface. More particularly, the second seal land 34 extends circumferentially around the axis 30. The second seal land 34 also extends radially between inner and outer seal land ends.

The second component 24 and the first component 22 are arranged at discrete locations along the axis 30. In this manner, the gap 28 extends axially between and is formed by the second seal land 34 and the first seal land 32.

The second component 24 may also include a shelf 36, which may operate as a seal ring locator and/or a third seal land. The shelf 36 of FIG. 1 extends axially away from the second seal land 34 and axially towards (but typically not to) the first seal land 32. This shelf 36 of FIG. 1 generally forms an inner peripheral boarder of the gap 28.

Figure 2:
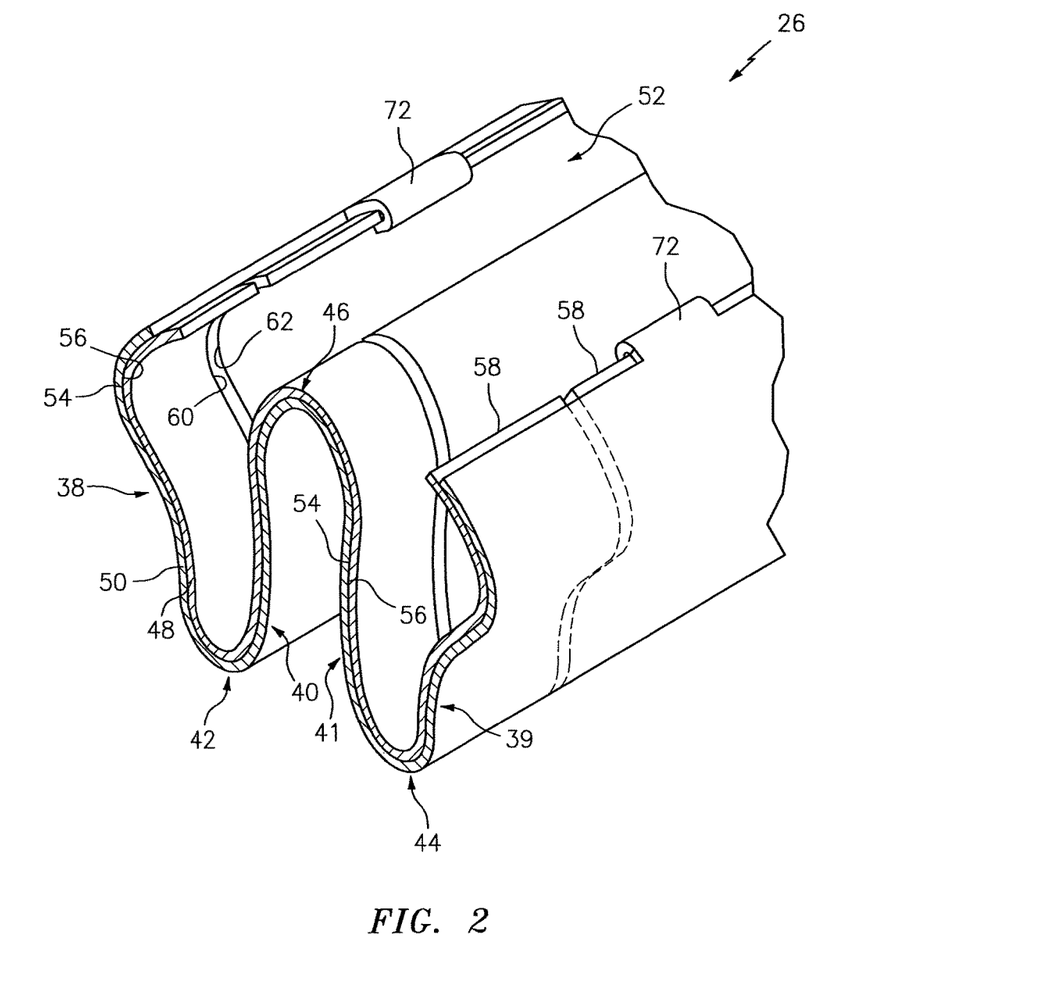
FIG. 2 is a partial perspective illustration of a multi-ply seal ring for the assembly of FIG. 1.

Referring to FIG. 2, the multi-ply seal ring 26 is configured with an undulating (e.g., overlapping and/or convoluted) cross-sectional geometry, which extends circumferentially about the axis 30 providing the multi-ply seal ring 26 with a full-hoop body. In the specific embodiment of FIG. 2, the multi-ply seal ring 26 is configured as a W-type seal ring with a generally W-shaped cross-sectional geometry. More particularly, the multi-ply seal ring 26 includes outer legs 38 and 39 and inner legs 40 and 41, which are disposed (e.g., axially) between the outer legs 38 and 39. Radially inner ends of the outer and inner legs 38 and 40 are connected together at a first radially inner, trough region 42. Radially inner ends of the outer and inner legs 39 and 41 are connected together at a second radially inner, trough region 44. Radially outer ends of the inner legs 40 and 41 are connected together at a radially outer, peak region 46. The multi-ply seal ring 26 of the present disclosure, however, is not limited to such an exemplary configuration as described below in further detail.

Referring still to FIG. 2, the multi-ply seal ring 26 is configured with at least two plies. Each of these seal ring plies is configured as a discrete seal ring. The multi-ply seal ring 26 of FIG. 2, for example, includes an inner seal ring 48 forming one of the plies and an outer seal ring 50 forming another one of the plies. The terms "inner" and "outer" are used herein to describe how the seal rings 48 and 50/plies are configured (e.g., nested) relative to one another within the multi-ply seal ring 26. The inner seal ring 48, for example, is positioned within an inner channel 52 formed by outer seal ring 50 and thereby nested within the outer seal ring 50. The inner seal ring 48, however, need not be radially within the outer seal ring 50 relative to the axis 30. For example, a portion of the outer seal ring 50 of FIG. 2 is radially within a corresponding portion of the inner seal ring 48.

Figure 3:
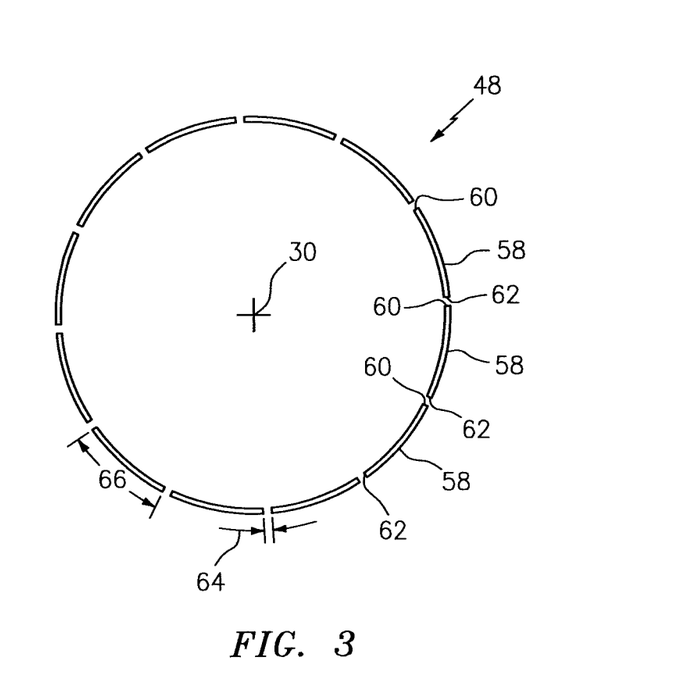
FIG. 3 is a schematic end view of a segmented inner seal ring for the multi-ply seal ring of FIG. 2.
Figure 4:
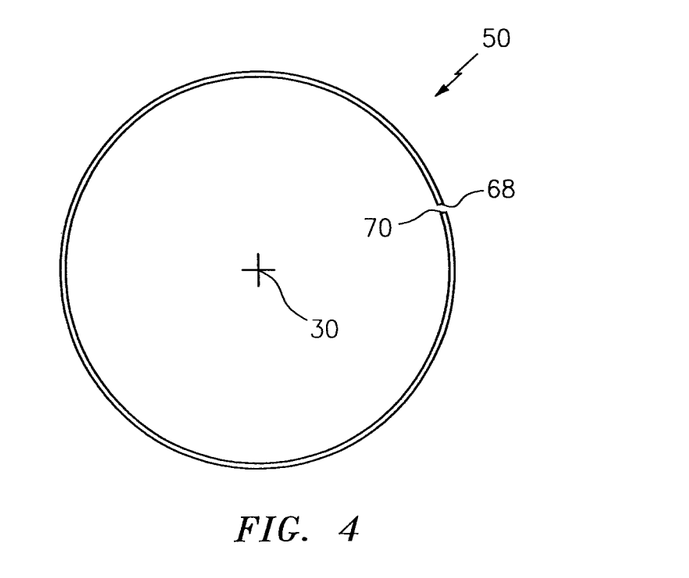
FIG. 4 is a schematic end view of an outer seal ring for the multi-ply seal ring of FIG. 2.

Each of the seal rings 48 and 50 extends circumferentially around the axis 30, thereby providing each seal ring 48, 50 with a generally annular body; e.g., see FIGS. 3 and 4. The seal rings 48 and 50 may be configured (e.g., shaped) with substantially similar cross-sectional geometries. For example, the inner seal ring 48 and the outer seal ring 50 of FIG. 2 are configured as W-type seal rings with generally W-shaped cross-sectional geometries. The seal rings 48 and 50 are further configured (e.g., sized) such that, when nested together, substantially all (or a portion) of an exterior surface 54 of the inner seal ring 48 is adjacent, proximate and/or engaging an interior surface 56 of the outer seal ring 50, where the interior surface 56 forms the channel 52 in which the inner seal ring 48 is disposed. The inner seal ring 48 and its exterior surface 54, therefore, conform to (e.g., follow) the outer seal ring 50 and its interior surface 56. Of course, in some embodiments, there may be one or more slight gaps between the seal elements 48 and 50 due to manufacturing tolerances, imperfections or otherwise.

Referring to FIG. 3, the inner seal ring 48 includes a plurality of discrete arcuate inner ring segments 58. Each of these inner ring segments 58 extends circumferentially about the axis 30 between opposing segments ends 60 and 62. The inner ring segments 58 are disposed at discrete locations circumferentially about the axis 30 in an annular array. Within this array, the segment ends 60 and 62 of circumferentially adjacent inner ring segments 58 are positioned next to and in close proximity to one another. A circumferential distance 64 between those adjacent segments ends 60 and 62, for example, is less than a circumferential length 66 of the respective segments 58. With the foregoing arrangement, the inner ring segments 58 are arranged end-to-end within the annular array. In the embodiment of FIG. 3, the circumferential length 66 may be more than, for example, 5, 10 or 20 times greater than the inter-segment distance 64; however, the present disclosure is not limited to the foregoing exemplary values.

The segmented configuration of the inner seal ring 48 may enable the inner seal ring 48 and some or all of its segments 58 to be constructed from material (e.g., metal) which may otherwise be difficult to form into an annular ring. The inner ring segments 58, for example, may be formed from a super alloy metal with a single crystal microstructure. An exemplary super alloy metal is, but is not limited to, PWA 1484 alloy (trademarked by United Technologies Corporation of Hartford, Conn.). The term "single crystal" may refer to a microstructure with a pattern of single crystal dendrites, where substantially all of the dendrites are solidified in a common crystallographic orientation. However, the inner seal ring 48 of the present disclosure is not limited to the foregoing exemplary microstructure or materials.

Referring to FIG. 4, the outer seal ring 50 may be configured with a generally annular unitary body. The term "unitary" may described a body which is formed as a single unit/a monolithic body, which is in contrast to a body made of segments as described above with respect to the inner seal ring 48. The outer seal ring 50 of FIG. 4, for example, is configured as a split ring. This outer seal ring 50 body, in particular, extends circumferentially around the axis 30 between opposing ends 68 and 70. The ends 68 and 70 are positioned next to and in close proximity to one another; e.g., in an end-to-end arrangement. With such a configuration, the outer seal ring 50 may provide a backbone for the inner ring segments 58 and hold the inner ring segments 58 together. In addition, the outer seal ring 50 may close/seal the inter-segment gaps between ends 60 and 62 (see FIG. 2). For example, the split/gap between the ends 68 and 70 may be circumferentially offset from each inter-segment gap between adjacent segments 58 such that fluid (e.g., gas) cannot easily flow through the inter-segment gaps.

The outer seal ring 50 may be constructed from a material that is different from the inner seal ring 48 material. This may enable the outer seal ring 50 to be configured with its generally annular unitary body. This may also or alternatively enable the outer seal ring 50 to provide the multi-ply seal ring 26 with different physical properties than that of the inner seal ring 48. For example, the outer seal ring 50 material may be constructed from non-hardenable metal (e.g., cobalt and/or nickel alloy) that exhibits high temperature capability, good wear resistance and good elongation characteristics. The inner seal ring 48 material, on the other hand, may be constructed from a single crystal metal alloy with exceptionally high temperature, strength and resilience capability. The outer seal ring 50 may be constructed from metal such as, but not limited to, Haynes 188 alloy, which is a cobalt-based alloy. However, the present disclosure is not limited to the foregoing exemplary materials. Furthermore, in other embodiments, the outer seal ring 50 and the inner seal ring 48 may be constructed from the same type or otherwise like materials.

Referring again to FIG. 1, the multi-ply seal ring 26 is disposed axially between the first seal land 32 and the second seal land 34, and circumscribes the shelf 36. The first (e.g., left-hand-side) outer leg 38 of the multi-ply seal ring 26 axially engages (e.g., contacts and is axially biased against) the first seal land 32. The second (e.g., right-hand-side) outer leg 39 of the multi-ply seal ring 26 axially engages (e.g., contacts and is axially biased against) the second seal land 34. The radially inner, trough regions 42 and 44 may each radially engage or be positioned radially next to the shelf 36; note, the trough regions 42 and 44 may each be positioned radially next to, but may not touch, the shelf 36 where the outer seal ring 50 or the entire seal ring 26 is not circumferentially split. In this configuration, the multi-ply seal ring 26 is sealingly engaged between and substantially seals the gap 38 between the first component 22 and the second component 24. The radial engagement between the seal ring 26 and the shelf 36 may provide additional restriction/seal for flow that goes past the aft leg 39, but may not restrict flow that flows past the forward leg 38.

Figure 5:
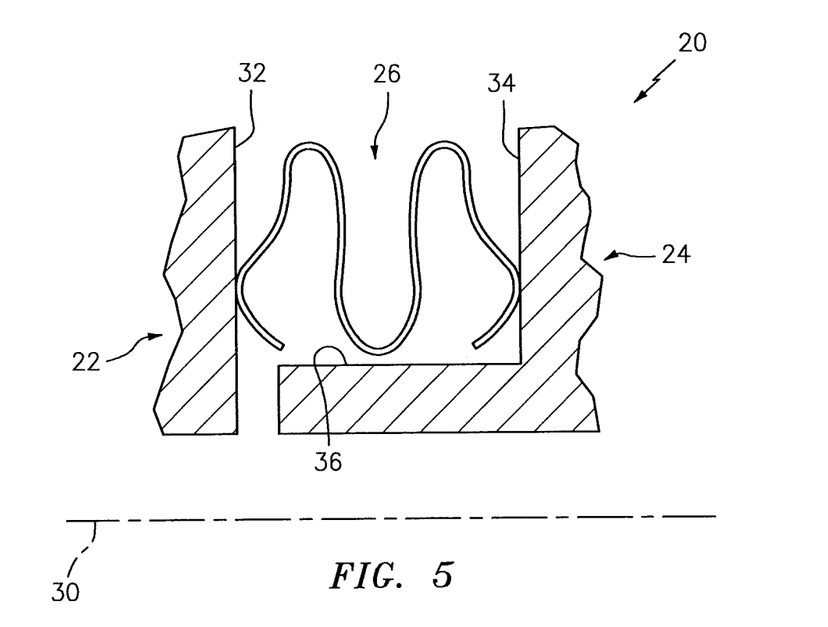
FIGS. 5-9 are partial schematic sectional illustrations of assemblies with alternative multi-ply seal rings.
Figure 6:
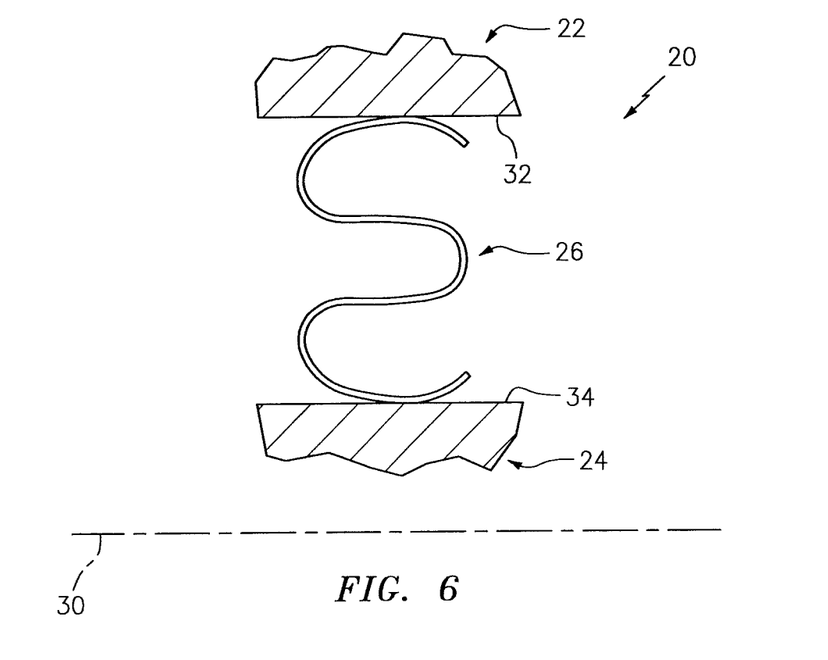
Figure 7:
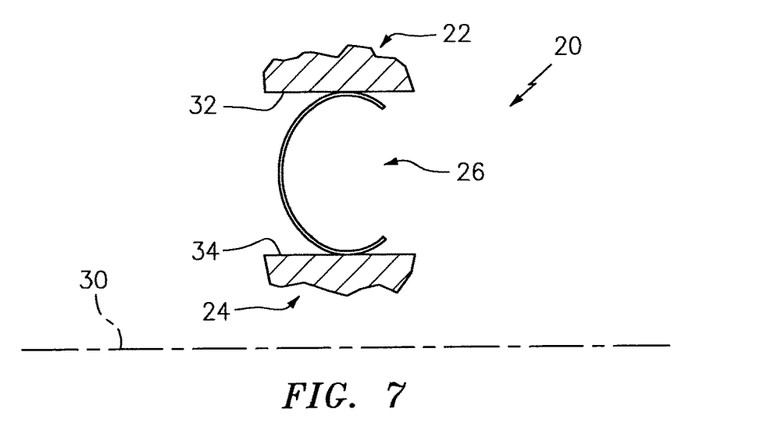
Figure 8:
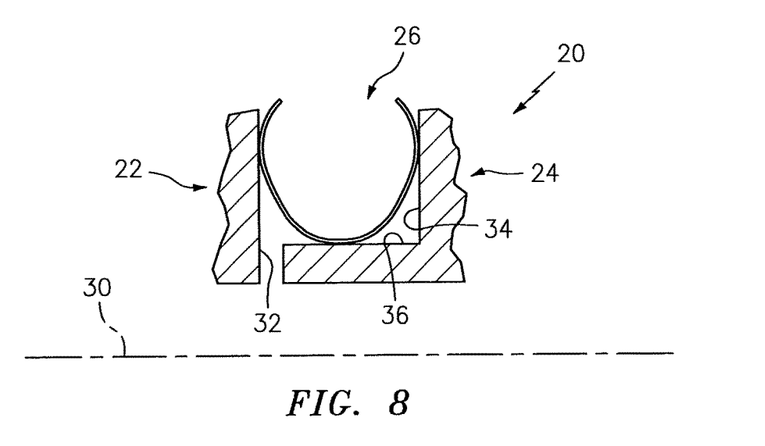
Figure 9:
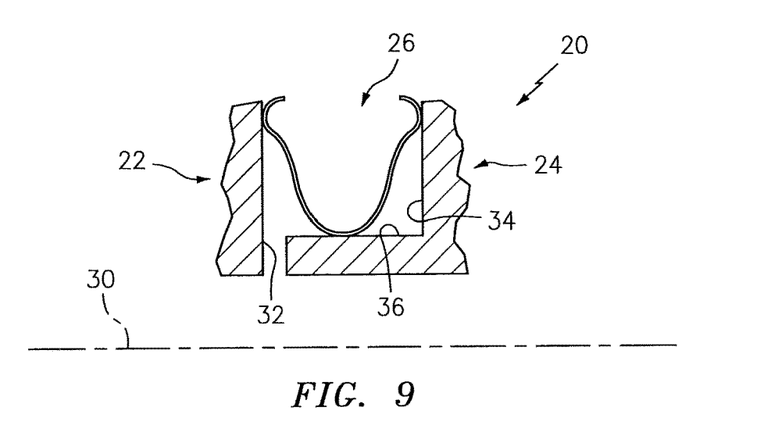

The multi-ply seal ring 26 is described above as a W-type seal ring for ease of description. However, the multi-ply seal ring 26 of the present disclosure is not limited to such an exemplary configuration. For example, the cross-sectional geometry of the multi-ply seal ring 26 may be re-orientated to configure the multi-ply seal ring 26 as an M-type seal ring as shown in FIG. 5, or an E-type seal ring as shown in FIG. 6. With the configuration of FIG. 6, the multi-ply seal ring 26 may extend radially between the first seal land 32 and the second seal land 34. In other examples, the multi-ply seal ring 26 may configured to have a single undulation, rather than multiple undulations. For example, the multi-ply seal ring 26 may be configured as a C-type seal ring as shown in FIG. 7, a U-type seal ring as shown in FIG. 8 or an omega-type seal ring as shown in FIG. 9. In still other examples, the multi-ply seal ring 26 may be configured to have more than two undulations; e.g., three, four or more undulations. For example, the multi-ply seal ring 26 may configured as a double W, M or E-type seal, or as a triple C, U or omega-type seal. Various other seal types and configurations are also contemplated by the present disclosure.

Figure 10:
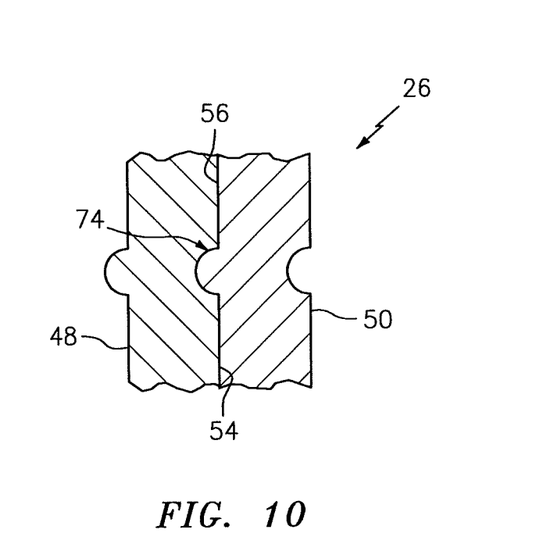
FIG. 10 is a partial sectional schematic illustration of an engagement between an inner seal ring and an outer seal ring.

Referring again to FIG. 2, the inner seal ring 48 may be mechanically secured to the outer seal ring 50. This mechanical connection may be in the form of the inner ring segments 58 being tightly nested within the outer seal ring 50. The mechanical connection may also or alternatively be provided through one or more retainers, which may also be configured as anti-rotation features. For example, in the specific embodiment of FIG. 2, each retainer is configured as a tab 72. This tab 72 projects out from a distal end of an outer leg of the outer seal ring 50, and may be bent over a corresponding outer leg distal end of the inner seal ring 48. In addition or alternatively, the tab 72 may be seated within a notch in the corresponding outer leg distal end. In another example, referring to FIG. 10, at least one of the retainers is configured as a dimple 74 (or projection), which creates a press/compression/biased type connection between the inner seal ring 48 and the outer seal ring 50. Of course, in other embodiments, the inner seal ring 48 and the outer seal ring 50 may also or alternatively be welded, brazed, adhered or otherwise bonded together.

Figure 11:
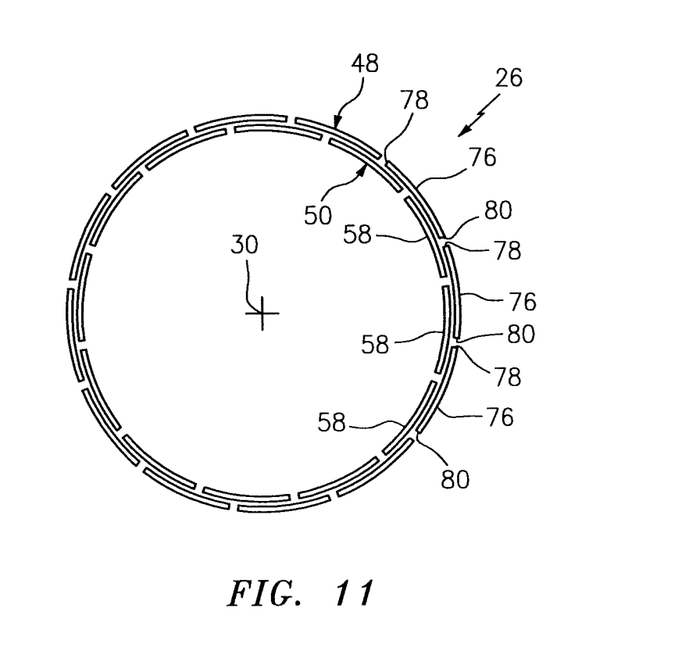
FIG. 11 is a schematic end view of the segmented inner seal ring and an alternative segmented outer seal ring.

Referring now to FIG. 11, in some embodiments, the outer seal ring 50 includes a plurality of discrete arcuate outer ring segments 76. Each of these outer ring segments 76 extends circumferentially about the axis 30 between opposing segments ends 78 and 80. The outer ring segments 76 are disposed at discrete locations circumferentially about the axis 30 in another annular array. Within this array, the segment ends 78 and 80 of circumferentially adjacent outer ring segments 76 are positioned next to and in close proximity to one another. With the foregoing arrangement, the inner ring segments 58 are arranged end-to-end within the annular array. The outer ring segments 76 may be circumferentially offset from the inner ring segments 58 so as to cover and thereby seal the inter-segment gaps in the inner and the outer seal rings 48 and 50. In still other embodiments, referring now to FIG. 12, where the outer seal ring 50 includes the outer ring segments 76, the inner seal ring 48 may be configured with a unitary, unsegmented full hoop body.

Figure 13:
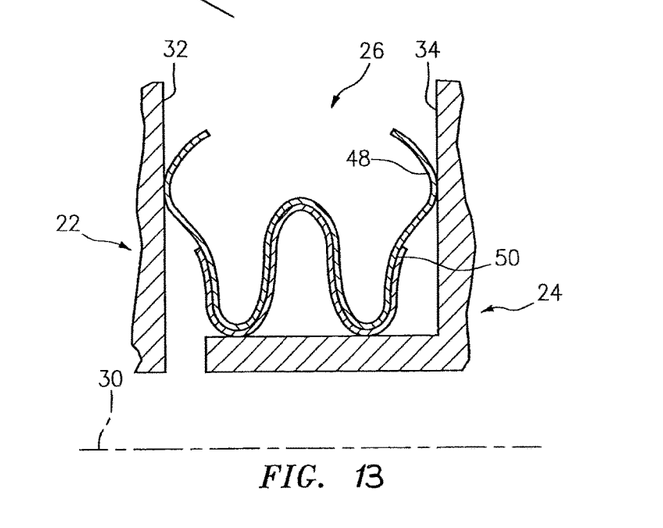
FIG. 13 is a partial schematic sectional illustration of an alternative assembly for a piece of rotational equipment.
Figure 14:
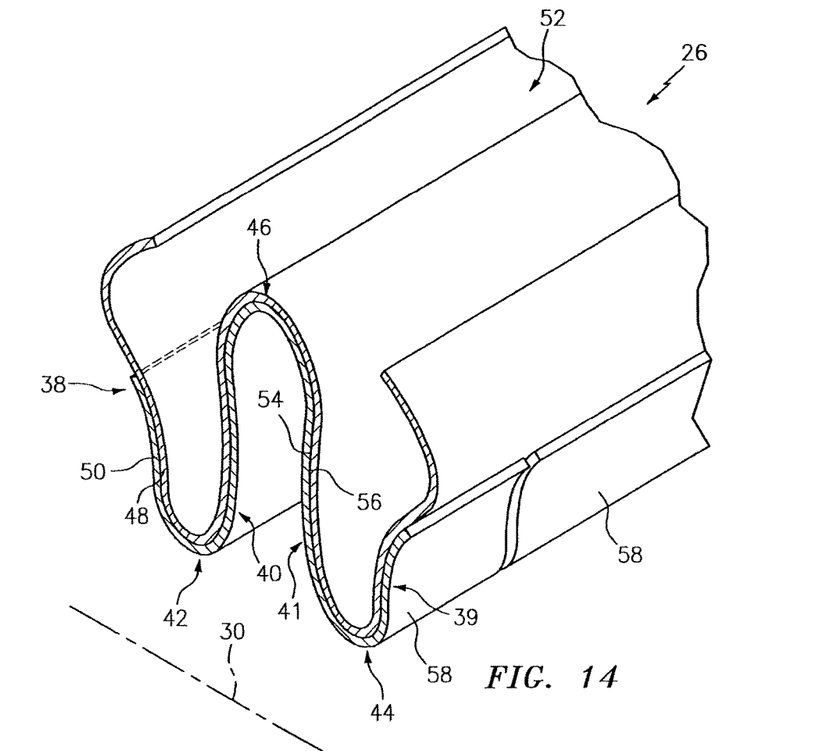
FIG. 14 is a partial perspective illustration of a multi-ply seal ring for the assembly of FIG. 13.

In some embodiments, the outer seal ring 50 may engage the first and the second components 22 and 24 as general described above. In alternative embodiments, however as shown in FIGS. 13 and 14 for example, the multi-ply seal ring 26 may be configured such that the inner seal ring 48 engages one or both of the first and the second components 22 and 24. In the embodiment of FIGS. 13 and 14, for example, radially outer distal ends of the outer legs of the outer seal ring 50 are radially recess inward from radially outer distal ends of the outer legs of the inner seal ring 48. Of course, in other embodiments, the multi-ply seal ring 26 may be configured such that one of the rings 48, 50 engages one of the components 22, 24 and the other one of the rings 50, 48 engages the other one of the components 24, 22.

Figure 15:
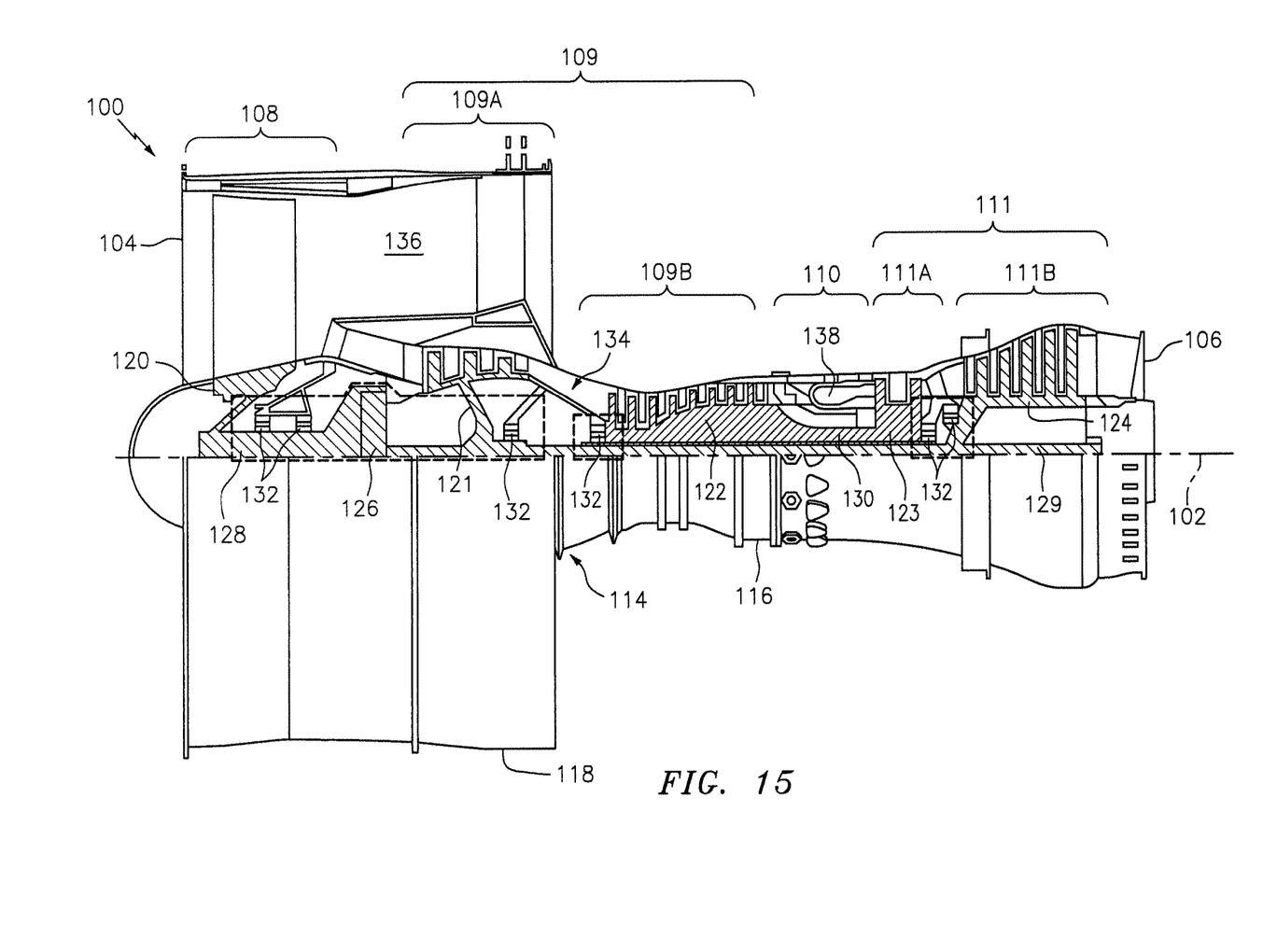
FIG. 15 is a side cutaway illustration of a gas turbine engine.

In some embodiments, the assembly 20 may be configured as or in a system for an aero gas turbine engine. FIG. 15 illustrates an exemplary embodiment of such a gas turbine engine 100, which is configured as a geared turbofan gas turbine engine. This turbine engine 100 extends along an axial centerline 102 (e.g., the axis 30) between an upstream airflow inlet 104 and a downstream airflow exhaust 106. The turbine engine 100 includes a fan section 108, a compressor section 109, a combustor section 110 and a turbine section 111. The compressor section 109 includes a low pressure compressor (LPC) section 109A and a high pressure compressor (HPC) section 109B. The turbine section 111 includes a high pressure turbine (HPT) section 111A and a low pressure turbine (LPT) section 111B.

The engine sections 108-111 are arranged sequentially along the centerline 102 within an engine housing 114. This housing 114 includes an inner case 116 (e.g., a core case) and an outer case 118 (e.g., a fan case). The inner case 116 may house one or more of the engine sections 109-111; e.g., an engine core. The outer case 118 may house at least the fan section 108.

Each of the engine sections 108, 109A, 109B, 111A and 111B includes a respective rotor 120-124. Each of these rotors 120-124 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 120 is connected to a gear train 126, for example, through a fan shaft 128. The gear train 126 and the LPC rotor 121 are connected to and driven by the LPT rotor 124 through a low speed shaft 129. The HPC rotor 122 is connected to and driven by the HPT rotor 123 through a high speed shaft 130. The shafts 128-130 are rotatably supported by a plurality of bearings 132. Each of these bearings 132 is connected to the engine housing 114 by at least one stationary structure such as, for example, an annular support strut.

During operation, air enters the turbine engine 100 through the airflow inlet 104. This air is directed through the fan section 108 and into a core gas path 134 and a bypass gas path 136. The core gas path 134 extends sequentially through the engine sections 109-111. The bypass gas path 136 extends away from the fan section 108 through a bypass duct, which circumscribes and bypasses the engine core. The air within the core gas path 134 may be referred to as "core air". The air within the bypass gas path 136 may be referred to as "bypass air".

The core air is compressed by the compressor rotors 121 and 122 and directed into a combustion chamber 138 of a combustor in the combustor section 110. Fuel is injected into the combustion chamber 138 and mixed with the compressed core air to provide a fuel-air mixture. This fuel air mixture is ignited and combustion products thereof flow through and sequentially cause the turbine rotors 123 and 124 to rotate. The rotation of the turbine rotors 123 and 124 respectively drive rotation of the compressor rotors 122 and 121 and, thus, compression of the air received from a core airflow inlet. The rotation of the turbine rotor 124 also drives rotation of the fan rotor 120, which propels bypass air through and out of the bypass gas path 136. The propulsion of the bypass air may account for a majority of thrust generated by the turbine engine 100, e.g., more than seventy-five percent (75%) of engine thrust. The turbine engine 100 of the present disclosure, however, is not limited to the foregoing exemplary thrust ratio.

The assembly 20 may be included in various aircraft and industrial turbine engines other than the one described above as well as in other types of rotational and other types of equipment. The assembly 20, for example, may be included in a geared turbine engine where a gear train connects one or more shafts to one or more rotors in a fan section, a compressor section and/or any other engine section. Alternatively, the assembly 20 may be included in a turbine engine configured without a gear train. The assembly 20 may be included in a geared or non-geared turbine engine configured with a single spool, with two spools (e.g., see FIG. 15), or with more than two spools. The turbine engine may be configured as a turbofan engine, a turbojet engine, a propfan engine, a pusher fan engine or any other type of turbine engine. The present disclosure therefore is not limited to any particular types or configurations of turbine engine. Furthermore, as mentioned above, the assembly 20 of the present disclosure may also be utilized for non-turbine engine applications.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A multi-ply seal ring, comprising:
an inner seal ring including a plurality of discrete inner ring segments disposed circumferentially about an axis in an annular array, the inner ring segments arranged end-to-end within the annular array; and
an outer seal ring, the inner seal ring engaged with and nested within the outer seal ring;
wherein the outer seal ring comprises a single monolithic body that extends circumferentially about the axis between a first outer ring end and a second outer ring end, and a first of the inner ring segments covers a gap defined circumferentially between the first outer ring end and the second outer ring end.

2. The multi-ply seal ring of claim 1, wherein a first of the inner ring segments comprises metal with a single crystal microstructure.

3. The multi-ply seal ring of claim 1, wherein the inner seal ring comprises first material, and the outer seal ring comprises second material that is different than the first material.

4. The multi-ply seal ring of claim 1, wherein the inner seal ring comprises first material, and the outer seal ring comprises second material that is the same as the first material.

5. The multi-ply seal ring of claim 1, wherein a first of the inner ring segments is mechanically secured with the outer ring seal.

6. The multi-ply seal ring of claim 1, wherein a first of the inner ring segments is bonded to the outer seal ring.

7. The multi-ply seal ring of claim 1, further comprising a retainer that secures a first of the inner ring segments with the outer seal ring.

8. The multi-ply seal ring of claim 1, further comprising an anti-rotation feature that secures a first of the inner ring segments with the outer seal ring.

9. The multi-ply seal ring of claim 1, wherein the inner seal ring and the outer seal ring are each configured with a cross-sectional geometry with a single undulation.

10. The multi-ply seal ring of claim 1, wherein the inner seal ring and the outer seal ring are each configured with a cross-sectional geometry with a plurality of undulations.

11. A multi-ply seal ring, comprising:
an inner seal ring comprising metal with a single crystal microstructure and extending circumferentially about an axis; and
an outer seal ring, the inner seal ring engaged with and nested within the outer seal ring.

12. The multi-ply seal ring of claim 11, wherein the inner seal ring includes a plurality of discrete inner ring segments disposed circumferentially about the axis in an annular array, and the inner ring segments are arranged end-to-end within the annular array.

13. The multi-ply seal ring of claim 11, wherein the outer seal ring comprises second material that is different than the metal.

14. The multi-ply seal ring of claim 11, wherein the outer seal ring comprises second material that is the same as the metal.

15. The multi-ply seal ring of claim 11, wherein the outer seal ring comprises a unitary generally annular body.

16. A multi-ply seal ring, comprising:
a plurality of seal rings including an inner seal ring and an outer seal ring;
the inner seal ring engaged with and nested within the outer seal ring;
a first of the seal rings including a plurality of discrete ring segments disposed circumferentially about an axis in an annular array, the ring segments arranged end-to-end within the annular array; and
a second of the seal rings comprising single unitary body that extends circumferentially about the axis between a first ring end and a second ring end, and a first of the ring segments overlapping a gap defined circumferentially between the first ring end and the second ring end.

17. The multi-ply seal ring of claim 16, wherein the first of the seal rings is the inner seal ring, and the ring segments are inner ring segments.

18. The multi-ply seal ring of claim 16, wherein the first of the seal rings is the outer seal ring, and the ring segments are outer ring segments.

19. The multi-ply seal ring of claim 1, wherein each adjacent pair of the discrete inner ring segments is completely separated from one another by a gap.

20. The multi-ply seal ring of claim 1, wherein each of the discrete inner ring segments forms an entire single monolithic body.

21. The multi-ply seal ring of claim 1, wherein a circumferentially adjacent pair of the discrete inner ring segments are positioned next to and in close proximity to one another, but are not physically connected to one another within the inner seal ring.

22. The multi-ply seal ring of claim 11, wherein
the inner seal ring includes a plurality of discrete inner ring segments disposed circumferentially about the axis in an annular array; and
the outer seal ring comprises a single monolithic body that extends circumferentially about the axis between a first outer ring end and a second outer ring end, and a first of the inner ring segments overlaps a gap defined circumferentially between the first outer ring end and the second outer ring end.

23. The multi-ply seal ring of claim 11, wherein
the outer seal ring includes a plurality of discrete outer ring segments disposed circumferentially about the axis in an annular array; and
the inner seal ring comprises a single monolithic body that extends circumferentially about the axis between a first inner ring end and a second inner ring end, and a first of the outer ring segments overlaps a gap defined circumferentially between the first inner ring end and the second inner ring end.

* * * * *